United States Patent [19]

Gatechair

[11] 4,116,787

[45] Sep. 26, 1978

[54] CURABLE AQUEOUS EMULSIONS CONTAINING ETHYLENICALLY UNSATURATED TERTIARY AMINES

[75] Inventor: Leslie Gatechair, Barrington, Ill.

[73] Assignee: DeSoto, Inc., Des Plaines, Ill.

[21] Appl. No.: 629,558

[22] Filed: Nov. 6, 1975

[51] Int. Cl.$^2$ .................. C08F 2/50; C08L 33/02; C08L 33/08
[52] U.S. Cl. ................ 204/159.23; 96/115 P; 260/29.6 HN; 526/311; 526/312
[58] Field of Search ............. 260/29.6 HN; 526/23, 526/311, 312; 204/159.23; 96/115 P

[56] References Cited

U.S. PATENT DOCUMENTS

| | | | |
|---|---|---|---|
| 2,892,822 | 6/1959 | Gray et al. | 260/29.6 HN |
| 3,766,156 | 10/1973 | Kine et al. | 260/29.6 HN |
| 3,844,916 | 10/1974 | Gaske | 204/159.16 |
| 3,849,373 | 11/1974 | Siegle et al. | 526/312 |
| 3,901,857 | 8/1975 | Sackman et al. | 526/312 |
| 3,976,615 | 8/1976 | Sekmakas | 260/29.6 HN |
| 3,985,698 | 10/1976 | Matsudaira et al. | 260/29.6 HN |

Primary Examiner—Walter C. Danison
Attorney, Agent, or Firm—Dressler, Goldsmith, Clement, Gordon & Shore, Ltd.

[57] ABSTRACT

Aqueous emulsion coating compositions which can be cured with ultraviolet light or by addition polymerization are formed by emulsifying viscous droplets containing ethylenically unsaturated tertiary amine into water with the aid of a solubilizing acid.

18 Claims, No Drawings

CURABLE ACUEOUS EMULSIONS CONTAINING ETHYLENICALLY UNSATURATED TERTIARY AMINES

The present invention relates to aqueous coating compositions in which the curable resin in the discontinuous phase is constituted by viscous droplets containing ethylenically unsaturated tertiary amine. An ultraviolet curing system is particularly contemplated.

It is known to combine ultraviolet photosensitizers in ethylenically unsaturated liquids, these normally being applied at 100% solids and cured by ultraviolet light exposure. However, application problems limit the viscosity of the liquid system which can be applied. It is desired to apply liquids of greater viscosity than can be handled directly, and also to obtain the advantages of water emulsion application, especially in an ultraviolet curable system. It is also desired to be able to rely upon resins of higher molecular weight, and lower volatility so as to reduce the toxicity of the materials which are handled.

These goals are achieved in accordance with this invention in which an ethylenically unsaturated tertiary amine (preferably a polyacrylate) in the form of a viscous liquid or semi-solid, preferably having a viscosity of at least 200 centipoises, is emulsified in water with the aid of a solubilizing acid to provide an emulsion containing viscous droplets of at least partially neutralized tertiary amine. This emulsion preferably has a resin solids content of at least 40% by weight and a pH of from 5.0–8.5, preferably 6.0 up to 7.0. An ultraviolet photosensitizer is preferably incorporated in the emulsion (preferably into the oil phase thereof) and the emulsion is applied as a coating and a film is formed by coalescence of the emulsion particles. This film, when it contains the photosensitizer, is curable upon ultraviolet exposure.

Any ethylenically unsaturated tertiary amine may be used, so long as it can be emulsified in water with the aid of a solubilizing acid. Polyethylenic materials, especially polyacrylates, are particularly contemplated.

These unsaturated amines can be formed in various ways. It is preferred to react an organic compound containing one or more ethylenic side chains, preferably a polyacrylate, with a small proportion of aliphatic amine containing from one to a maximum of three amino hydrogen atoms, preferably a monosecondary amine, to produce an ethylenically unsaturated tertiary amine adduct by Michael addition, this tertiary amine retaining much of the original unsaturation. This unsaturated tertiary amine is then reacted with a solubilizing acid to protonate the same and enable it to be emulsified in water. Based on each mole of ethylenic organic compound which is modified, at least about 0.05 equivalent of amine should be used. The maximum proportion of amine is determined by that amount which destroys the desired emulsion, but this will vary with the molecular weight and hydrophobicity of the organic compound, and also with the nature of the solubilizing acid. Usually, one will use from 0.2–1.2 equivalents of amine per mole of ethylenic organic compound. The existence of an emulsion is documented by the low viscosity which is obtained, and also by the turbidity which is produced.

It is preferred to use more amine than is required to provide a stable emulsion when fully neutralized and then to employ only partial neutralization, namely, not more than 75% neutralization, preferably not more than 50% neutralization. When this is done, unneutralized tertiary amine groups remain and these speed the ultraviolet cure. One must be careful when using more amine than needed to avoid excessive neutralization, for this serves to increase the water solubility of the unsaturated amine which, when it destroys the desired emulsion characteristic, produces a marked increase in viscosity.

Similar unsaturated amines can be formed by reacting a tertiary amine containing a single hydroxy group with an organic diisocyanate to form a tertiary amine monoisocyanate when is then reacted with an ethylenically unsaturated hydroxy compound, such as pentaerythritol triacrylate or an epoxy polyacrylate. This introduces the amine group without destroying ethylenic unsaturation, and the resulting ethylenically unsaturated tertiary amines so-provided are useful in the same way as the adducts formed by Michael addition.

While any organic compond containing one or more ethylenically unsaturated side chains may be used, polyacrylates are particularly contemplated. This is because acrylate unsaturation responds rapidly to ultraviolet radiation and reacts easily with amino hydrogen atoms. Appropriate polyacrylates are illustrated by pentaerythritol triacrylate, epoxy diacrylates, trimethylol propane triacrylate and the like. Increased acrylate functionality can be provided by consuming hydroxy functionality by reaction with an acrylate monoisocyanate, as for example, the reaction product of one mole of toluene diisocyanate with hydroxyethyl acrylate. This is particularly attractive when dealing with an epoxy diacrylate having sufficient molecular weight to provide hydroxy functionality which can be converted to acrylate functionality so as to increase the number of acrylate groups in a resinous matrix which provides good properties. Appropriate epoxy resins for this purpose are polyglycidyl ethers of a bisphenol, such as bisphenol A, having a 1,2-epoxy equivalency of from about 1.4 to about 2.0 and a molecular weight of from about 400 to about 6000, preferably from about 600 to about 4000.

While polyacrylates are preferred, as noted above, any ethylenically unsaturated group can be used which will adduct with amino hydrogen, such as the methacrylate or crotonate group. Also, while acrylate esters are preferred, ethers are also useful, such as polynorbornene ethers of polyhydric alcohols, such as glycerin, trimethylol propane, and pentaerythritol. The Michael addition reaction is fastest with acrylates, but it can be carried out with other ethylenically unsaturated moieties using heat and longer reaction periods.

It is of interest to observe that while the emulsions of this invention are preferably cured by ultraviolet exposure, one can instead cure the coatings with heat, preferably with the aid of a free radical polymerization catalyst. Even in the absence of ultraviolet photosensitizer, the applied coating can be cured with penetrating radiation, such as an electron beam.

The choice of amines with which to form the unsaturated amines is subject to considerable variation, but aliphatic amines are preferred since these have the highest reactivity with the ethylenic groups in the polyethylenic compound. The amine should have from one to two amino hydrogen atoms per molecule, but the preferred amine functionality is 1 in order to minimize the molecular weight of the tertiary amine Michael adduct.

Monosecondary amines are available, and are particularly preferred. The choice of a monosecondary amine is particularly important where the polyethylenic compound is of relatively high molecular weight, as in epoxy polyacrylates or where hydroxy functional polyacrylates are reacted with diisocyanates to increase molecular weight without reducing the ethylenic functionality.

The preferred monosecondary amines are illustrated by diethyl amine and dibutyl amine, diethyl amine being best in this invention. Dioctyl amine and diallyl amine are also useful. Hydroxy functional amines, such as diethanol amine are useful, but less preferred, because the hydroxy groups contribute to instability. Ethyl amine and butyl amine will illustrate higher functional amines which are useful, especially in admixture with the preferred monosecondary amines where they function to provide a controlled increase in viscosity.

From the standpoint of the viscosity of the polyethylenically unsaturated tertiary amines which are preferably resinous in this invention, the preferred resins, after solubilization with the solubilizing acid, have a viscosity of at least 500 centipoise, preferably in the range of a 6–50 poise.

The reaction between the amine and the ethylenic unsaturation is a known reaction, being easily forced to completion by moderate heat as taught in U.S. Pat. No. 3,844,916.

From the standpoint of association of the solubilizing acids which enable emulsification, the acid protonizes the amine groups to provide an emulsifying agent. The specific nature of the acid is of secondary significance. Inorganic acids, such as hydrochloric acid or sulfuric acid, are useful, though not preferred. It is presently preferred to employ phosphoric acid, glycolic acid (hydroxy acetic acid), or acetic acid, but other acids can be used, such as formic acid. Propionic acid is also useful.

The solubilizing acid is used in an amount to provide an oil-in-water emulsion having a preferred pH in the range of pH 6.0–7.0.

It is desired to emphasize the selection of phosphoric acid which provides unique results. As has been noted, it is desired to operate at a pH of from 6–7, especially at pH 6.3. This requires only 5% of phosphoric acid, which is a mild acid which does not injure the resin film. Using acetic acid, 10% is required. These values are calculated for a typical emulsion containing 50% nonvolatile solids. Also, phosphoric acid provides excellent emulsion stability, and since phosphoric acid is nonvolatile, there is no disagreeable odor.

Glycolic acid (hydroxy acetic acid) is also outstanding because it provides the best emulsion stability at the same pH and it is also nonvolatile. Also, the viscosity of the resin prior to addition of water is much lower when glycolic acid is used, and this is beneficial when dealing with the viscous resins preferably used herein.

All sorts of free radical polymerization catalysts can be dissolved or dispersed in the aqueous bath to enable a thermal cure. Azo-bis-isobutyronitrile will be used as illustrative. Other members of this class, such as benzoyl peroxide, are well known, and are also useful.

The class of ultraviolet photosensitizers is also well known, and it is illustrated in said U.S. Pat. No. 3,844,916. It will be illustrated herein using benzophenone, but benzoin ethers, especially the $C_1$–$C_4$ alkyl ethers are also preferred.

Organic solvent is not normally needed in this invention, but it is possible to use a small proportion of solvent for various purposes, but most importantly to permit the use of polyacrylates of such high molecular weight that they are insufficiently liquid for emulsification. The selection of solvent will vary with the intended purpose, but xylene or octyl alcohol will illustrate water immiscible solvents which can aid emulsification. 2-ethoxy ethanol acetate in small amount will illustrate a solvent which can aid particle coalescence during film formation.

The invention is illustrated in the examples which follow.

EXAMPLE 1

| Weight Percent | |
|---|---|
| 81.8 | Pentaerythritol polyacrylate [about 3.1 acrylate groups per molecule, average molecular weight about 290 (400 poise at 25° C.)] |
| 6.7 | Diethylamine (.319 equivalent per mol of polyacrylate) |
| 6.6 | Acetic acid (glacial) (about .315 mol - 100% of amine neutralized) |
| 4.9 | Benzophenone |
| 100.0 | |

The pentaerythritol triacrylate is reacted with the diethylamine by mixing for 20 minutes at 60° C. under reflux. The benzophenone and acetic acid components are dissolved in the product. Following cooling, the viscosity is measured to be increased to 720 poise at 25° C.

The above mixture is stirred into an equal weight of deionized water to produce a uniformly hazy, thin, oil-in-water emulsion having a pH of about 6.0 (1.62 poise at 25° C. Brookfield).

The cure rate under a single focused Hanovia 12 inches, 200 watt per inch mercury-Arc lamp was 100 feet/minute when curing calendared paper coated with the emulsion using a #4 wire wound rod. This drawdown dried water and tack free to a glossy finish (gloss 60–80 at 60° C.).

EXAMPLE 2

| Weight Percent | |
|---|---|
| 83.0 | Trimethylol propane polyacrylate [about 2.4 acrylate groups per molecule, average molecular weight about 280 (10 poise at 25° C.)] |
| 6.25 | Diethyl amine (.283 equivalent per mole of polyacrylate) |
| 5.75 | Acetic acid (glacial) (.256 equivalent - 90.4% neutralized) |
| 5.0 | Benzophenone |
| 100.0 | |

The reaction product of trimethylol propane triacrylate, reacted as in Example 1 above, had a viscosity of 16 poise at 25° C. When added to an equal weight of deionized water, a thin oil-in-water emulsion having a pH of about 6.3 and a viscosity of 0.52 poise at 25° C. (Brookfield) is formed.

EXAMPLE 3

The resin of Example 1 was inverted in water at 10% increments to produce stable vehicles containing 10% to 90% nonvolatile solids with viscosities ranging from 0.1 to 43.2 poise at 25° C.

EXAMPLE 4

The resin of Example 1, omitting the acetic acid component, inverted in a wide range of water levels produced nonuniform viscous sludges which could be emulsified upon subsequent introduction of the acetic acid component.

EXAMPLE 5

The emulsion in Example 1 (100 grams, 50% nonvolatile solids) was pigmented with 25 grams calcium carbonate, dispersed 10 minutes in a Waring blender, and applied to untreated Mylar. The cured translucent film (cured by exposure to 3 Hanovia 200 watt per inch lamps at 100 feet per minute, film applied using #4 wire wound rod) showed excellent adhesion and abrasion resistance (15 gloss at 60°) and serves as a drafting film possessing good abrasion resistance and which accepts pencil, ink, or ballpoint writing well. Normally, resins as viscous as those here involved and pigmented as in this Example could not be applied because they are too thick.

EXAMPLE 6

Two grams of Phthalocyanine Blue pigment were dispersed in 26 grams of the emulsion from Example 1 (50% nonvolatile solids). The resulting ink of gravure viscosity was applied to a calendared paper with a 180 quadragravure hand Breyer applicator and cured as in Example 5. The cured film was tack-free and possessed good gloss, and abrasion resistance.

EXAMPLE 7

The varnish in Example 1 was prepared with only about ½ equivalent of the amine neutralized with acetic acid.

| Weight Percent | |
|---|---|
| 84.8 | Pentaerythritol polyacrylate [about 3.1 acrylate groups per molecule, average molecular weight about 290 (400 poise at 25° C.)] |
| 6.7 | Diethylamine (.308 equivalent of amine per mol of polyacrylate) |
| 3.6 | Glacial acetic acid (.164 mols of acid, 53.2% neutralized) |
| 4.9 | Benzophenone |
| 100.0 | |

This varnish (reduced to 50% nonvolatile solids) had an improved cure rate of 300 feet per minute under the curing conditions of Example 1, as compared to the fully neutralized emulsion in Example 1 which cured at 100 feet per minute.

EXAMPLE 8

| Weight Percent | |
|---|---|
| 80.66 | Pentaerythritol polyacrylate [about 3.1 acrylate groups per molecule, average molecular weight about 290 (400 poise at 25° C.)] |
| 8.84 | Dipropyl amine (.316 equivalent of amine per mol of polyacrylate) |
| 6.60 | Glacial acetic acid (.317 mol of acid - about 100% neutralized) |
| 4.90 | Benzopheneone |
| 100.00 | |

The diethyl amine used in the previous examples can be replaced by other secondary amines which undergo the Michael addition reaction. Diisopropylamine substituted on a molar basis is shown above. Other secondary amines such as dibutylamine, dicocoamine, methyl, and isopropylamine work as well. Primary amines may be used to increase the viscosity of the anhydrous resin. These amines, such as butyl amine, and octyl amine, having two amine hydrogens susceptible to Michael addition are useful for increasing the molecular weight of the resin prior to reducing the viscosity with water as described above. Tertiary amines, not having a free amino hydrogen are not useful in this invention, although they are compatible and may be blended with compounds described within the invention.

EXAMPLE 9

The benzophenone component in the previous examples can be satisfactorily replaced by:
 a. 4.9% Diethoxy acetophenone
 b. Isobutyl benzoin ether.

EXAMPLE 10

The acetic acid in the previous examples can be replaced with half the weight of phosphoric acid to obtain stable emulsions which cure as well, but without the odor problem characteristic of acetic acid.

EXAMPLE 11

| Weight Percent | |
|---|---|
| 83.3 | Diacrylate of diglycidyl ether of bisphenol A having an epoxide equivalent weight of 175 |
| 8.33 | Diethylamine |
| 4.17 | Glacial acetic acid |
| 4.17 | Benzophenone |

The amine is reacted with the acrylate under reflux as in Example 1 followed with ½ neutralization with the acetic acid. Benzophenone is added as a photosensitizer. The resulting resin (> Z8 Gardner viscosity) reduced 1:1 with deionized water produced an oil-in-water emulsion of 3.5 poise Brookfield. The resin is found to be 99.6% non-volatile with a Gardner color of 6–7. The above emulsion applied to calendared paper using a #4 wire wound rod was cured by passing under a single focused 200 watt/inch Hanovia Mercury arc lamp at 100 feet per minute. The cured film was extremely scratch resistant and would resist 10–15 double methyl ethyl ketone rubs. Two subsequent passes under the lamp (3 total at 100 feet per minute) increased the methyl ethyl ketone resistance to more than 100 double methyl ethyl ketone rubs.

EXAMPLE 12

The epoxy diacrylate used in Example 11 was replaced with the addition product of 1 mole of epoxy novolac (Den 431 of Shell may be used) reacted with 1.8 moles of acrylic acid prepared as in U.S. Pat. No. 3,586,528. The resulting resin modified with diethylamine and acetic acid as in Example 11 had a Gardner color 8–9, and a Gardner viscosity anhydrous >Z8. Reducing 1:1 with deionized water produced an oil-in-water emulsion having a Brookfield viscosity of 3.2 poise. This resin cured at 1 pass, 100 feet per minute, to a film resisting 25 to 50 methyl ethyl ketone rubs, and it was tack free and scratch free.

EXAMPLE 13

An effort was made to reproduce Example 11 using phosphoric acid instead of acetic acid, but the resulting emulsion was more viscous than desired. Accordingly, Example 11 was repeated again, this time using a corresponding equivalent proportion of glycolic acid. Excellent results were obtained, and the viscosity of the emulsion was not excessive.

It is desired to stress the fact that the tertiary amine groups in this invention are chemically combined onto the ethylenically unsaturated material which is emulsified. This is critical in this invention. Thus, one may instead use the same ethylenically unsaturated material free of tertiary amine groups and a separate tertiary amine. When this is done, emulsions are not formed as will be illustrated in the following examples in which the tertiary amines noted were substituted on a molar basis into the formulation used in Example 1.

EXAMPLE 14

| Weight Percent | Mole Ratio | |
|---|---|---|
| 70.2 | 1.0 | Pentaerythritol polyacrylate [about 3.1 acrylate groups per molecule, average molecular weight about 290 (400 poise at 25° C.)] |
| 6.9 | 0.319 | N,N-dimethylethanol amine (molecular weight = 89) |
| 5.8 | 0.319 | Glacial acetic acid (100% neutralization) |
| 17.2 | — | Benzophenone |

The following observations were made:
1. Anhydrous resin blend is uniformly clear.
2. 10-20 ml. water were absorbed prior to precipitation.
3. The slow addition (with agitation) of an equal weight of water into the above mixture failed to produce a uniform oil-in-water emulsion.

EXAMPLE 15

| Weight Percent | Mole Ratio | |
|---|---|---|
| 67.3 | 1.0 | Pentaerythritol polyacrylate [about 3.1 acrylate groups per molecule, average molecular weight about 290 (400 poise at 25° C.)] |
| 22.2 | 0.319 | Dimethylsoyamine (molecular weight = 300 average) |
| 5.5 | 0.319 | Glacial acetic acid (100% neutralization) |
| 5.9 | — | Benzophenone |

The following observations were made:
1. Anhydrous blend is uniformly hazy.
2. Oil phase tended to separate from aqueous sludge. No stable emulsion was formed with an equal weight of water.

EXAMPLE 16

| Weight Percent | Mole Ratio | |
|---|---|---|
| 77.7 | 1.0 | Pentaerythritol polyacrylate [about 3.1 acrylate groups per molecule, average molecular weight about 290 (400 poise at 25° C.)] |
| 10.1 | 0.319 | N-methyl diethanol amine (molecular weight = 119) |
| 6.3 | 0.319 | Glacial acetic acid (100% neutralization) |
| 5.7 | — | |

The following observations were made:
1. Anhydrous resin blend is uniformly clear.
2. Aqueous blend separted quickly, but is slightly improved over Example 15. No stable oil-in-water emulsion is formed.
3. Additions of both amine and acid made no improvement in the aqueous sludge.

The invention is defined in the claims which follow.

I claim:

1. An aqueous emulsion curable coating composition comprising water having emulsified therein viscous droplets comprising polyethylenically unsaturated organic compound carrying at least one tertiary amine group reacted with a solubilzing acid to form a quaternary salt, said emulsion having a pH of from 5.0 – 8.5, and said polyethylenically unsaturated tertiary amine reaction product with said solubilizing acid in the absence of water having a viscosity of at least 200 centipoises.

2. An aqueous emulsion coating composition as recited in claim 1 in which said emulsion has a resin solids content of at least 40% by weight.

3. An aqueous emulsion coating composition as recited in claim 1 in which said ethylenically unsaturated tertiary amine reacted with a solubilizing acid in the absence of water has a viscosity of from 6–50 poise.

4. An aqueous emulsion coating composition as recited in claim 1 in which an ultraviolet photosensitizer is incorporated in said emulsion to render the same curable with ultraviolet light.

5. An aqueous emulsion coating composition as recited in claim 1 in which ultraviolet photosensitizer is incorporated in said viscous droplets.

6. An aqueous emulsion coating composition as recited in claim 1 in which said polyethylenically unsaturated tertiary amine is a polyacrylate carrying at least one tertiary amine group.

7. An aqueous emulsion coating composition as recited in claim 1 in which said emulsion has a pH in the range of pH 6.0 – 7.0.

8. An aqueous emulsion coating composition as recited in claim 1 in which said polyethylenically unsaturated tertiary amine is a polyacrylate reacted with at least 0.05 equivalents of aliphatic amine per mole of polyacrylate.

9. An aqueous emulsion coating composition as recited in claim 1 in which said polyethylenically unsaturated tertiary amine is a polyethylenically unsaturated organic compound Michael adducted with 0.2–1.2 equivalents of amine per mole of said organic compound.

10. An aqueous emulsion coating composition as recited in claim 9 in which the polyethylenically unsaturated organic compound is reacted with a monosecondary amine.

11. An aqueous emulsion coating composition as recited in claim 10 in which the monosecondary amine is selected from diethyl amine and dibutyl amine.

12. An aqueous emulsion coating composition as recited in claim 11 in which said polyethylenically unsaturated tertiary amine has a viscosity in excess of 500 poise.

13. An aqueous emulsion coating composition as recited in claim 1 in which said emulsion includes a free radical polymerization catalyst.

14. An aqueous emulsion coating composition as recited in claim 1 in which the solubilizing acid is glycolic acid.

15. An aqueous emulsion coating composition as recited in claim 1 in which the solubilizing acid is phosphoric acid.

16. An aqueous emulsion coating composition as recited in claim 1 in which the solubilizing acid is acetic acid.

17. An aqueous emulsion coating composition as recited in claim 1 in which the amine functionality is partially neutralized to an extent of less than 75% neutralization.

18. An aqueous emulsion coating composition as recited in claim 1 in which benzophenone ultraviolet photosensitizer is incorporated in said coating composition.

* * * * *